No. 620,744. Patented Mar. 7, 1899.
E. CRAIG.
TIRE TIGHTENER.
(Application filed Sept. 7, 1898.)
(No Model.)
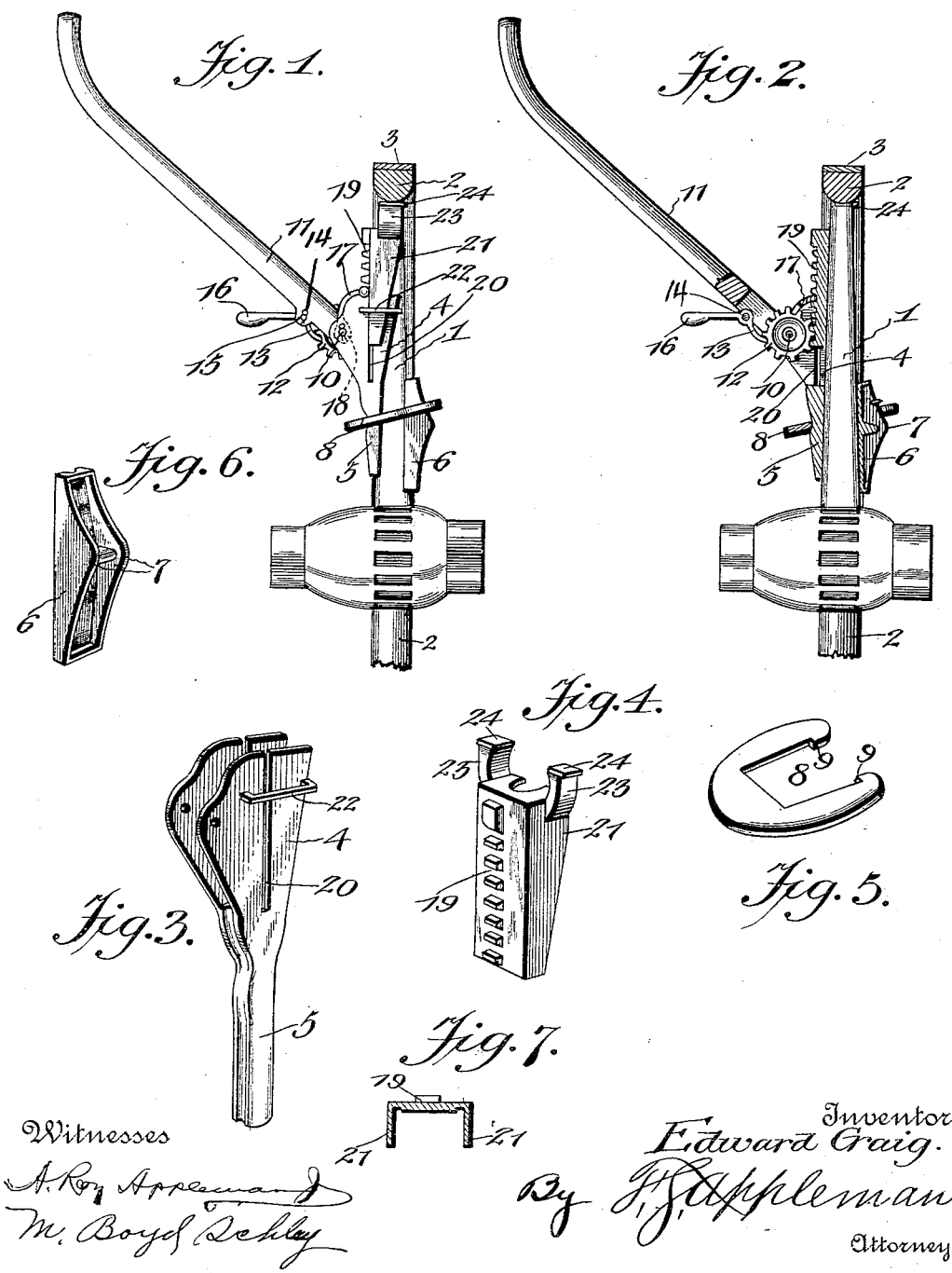
Witnesses
A. Roy Appleman
M. Boyd Schley
Inventor,
Edward Craig.
By J. F. Appleman
Attorney

UNITED STATES PATENT OFFICE.

EDWARD CRAIG, OF ALBION, ILLINOIS.

TIRE-TIGHTENER.

SPECIFICATION forming part of Letters Patent No. 620,744, dated March 7, 1899.

Application filed September 7, 1898. Serial No. 690,437. (No model.)

*To all whom it may concern:*

Be it known that I, EDWARD CRAIG, a citizen of the United States of America, residing at Albion, in the county of Edwards and State of Illinois, have invented certain new and useful Improvements in Tire-Tighteners, of which the following is a specification, reference being had therein to the accompanying drawings.

This invention relates to improvements in tire-tighteners, and has for its object the provision of novel means whereby the felly may be pressed outward into firm contact with the tire that a washer may be inserted under the felly to hold it securely against the tire.

A further object of the invention is to produce novel means in combination for distending the felly and for holding the parts in position while the washer is being applied, thus enabling a single operation to accomplish the result. Furthermore, the object of the invention is to produce a tire-tightener which will be strong and durable, as well as efficient and satisfactory in use, making it at the same time comparatively inexpensive to manufacture and sustain.

With the above and other objects in view the invention consists in the details of construction and in the arrangement and combination of parts to be hereinafter more fully set forth, and specifically enumerated in the annexed claims.

In describing the invention in detail reference will be had to the accompanying drawings, forming part of this specification, wherein like characters of reference denote corresponding parts in the several views, in which—

Figure 1 is a side view in elevation illustrating the invention applied to a spoke and a section of the rim with the tire in place. Fig. 2 is a sectional view with the upper and lower portions omitted. Figs. 3 and 4 are detail views of the means for fastening the parts in place. Fig. 5 is a view in perspective of a link. Fig. 6 is a similar view of a wedge. Fig. 7 is a transverse sectional view of a rack-bar.

In the drawings, 1 denotes a spoke, 2 a felly, and 3 a tire, all of ordinary construction, to which my invention is applied when the tire becomes loose. The bracket or head 4 has a shank 5 formed therewith, said shank being slightly concaved longitudinally in its lower surface to correspond with the contour of a spoke with which it is to come in contact. On the opposite side of the spoke I arrange a wedge 6, having its base concaved longitudinally to coact with the shank for anchoring the bracket. The wedge is provided with a rib 7, from which the wedge tapers in opposite directions, the said rib being nearer one end and the inclination from said rib to one end being of a greater taper than the opposite inclination, thus allowing for adjustments to spokes of greatly-varying sizes. A link 8, having angular ends 9, embraces the shank and wedge, and the angular ends of the link engage the under surface of the wedge and produce a clamping action as the wedge is forced in place.

Arranged transversely of the bracket is a bolt 10, on which is pivoted the lever 11. A pinion 12 is also journaled on the bolt 10, said pinion being embraced by the bifurcated end of the lever. A pawl 13 is pivoted to a pin 14, arranged in lugs 15 of the lever, and this pawl is so formed that the projecting end 16 thereof is of sufficient weight to retain the edge of the pawl in engagement with the pinion.

A gravity-detent 17 is provided with apertured extensions 18, by which it is swingingly mounted on the bolt 10, and this detent is adapted to engage the teeth of the rack-bar 19, which is operated by the pinion, as will be understood.

The rack-bar has formed therewith side extensions which slide in ways 20, cut from the wall of the bracket, and the flanges 21 on the extensions embrace the sides of the bracket. The guides 22, secured to the bracket, also receive the flanges as the rack-bar is moved, and by this construction rigidity is produced and undue play is obviated. The rack-bar is further provided with legs 23, terminating in feet 24, adapted to engage the under surface of a felly, so that when the shank is anchored and the lever is operated the pinion will be rotated through the action of the dog, and the rack-bar, taking motion from the pinion, is extended until the feet engage the felly. Then by further manipulation of the lever pressure will be exerted on the felly until it is pressed against the tire, after which the detent engaging the rack-bar will hold the parts in position and the operator may proceed to apply a backing or washer to hold the felly distended.

The construction, operation, and advantages will, it is thought, be understood from the foregoing description, it being noted that various changes in the proportions and other details of construction may be resorted to without departing from the spirit of the invention.

Having fully described my invention, what I claim as new, and desire to secure by Letters Patent, is—

1. A tire-tightener consisting of a bracket having a shank a wedge coacting with the shank and a link for embracing the shank and wedge, a rack-bar slidable in ways formed in the bracket, a pinion for operating the rack-bar, a lever, and a pawl pivoted to the lever, substantially as described.

2. A tire-tightener consisting of a bracket suitably anchored to a spoke, a rack-bar slidable in ways formed in the bracket, legs extending from the ends of the rack-bar, terminating in feet adapted to engage a felly, a pinion journaled on a bolt, a lever embracing the pinion and pivoted on the bolt, a pawl carried by the lever for engaging the pinion and a detent for engaging the teeth of the rack-bar and having apertured extensions arranged on the bolt with the lever, substantially as described.

3. A tire-tightener consisting of a suitable bracket, a rack-bar having flanges, guides through which said flanges are slidably arranged, legs extending from the ends of the rack-bar terminating in feet adapted to engage the felly, as and for the purpose described.

In testimony whereof I affix my signature in the presence of two witnesses.

EDWARD CRAIG.

Witnesses:
   GEO. FEMMAIS, Jr.,
   FRANK IBBOTSON.